United States Patent
Koenig et al.

(10) Patent No.: US 11,945,657 B2
(45) Date of Patent: Apr. 2, 2024

(54) SYSTEM AND METHOD FOR CONDITION MONITORING DURING THE OPERATION OF A CONVEYOR SYSTEM

(71) Applicant: SIEMENS LOGISTICS GMBH, Nuremberg (DE)

(72) Inventors: Frank Koenig, Dubai (AE); Ivan Castelino, Dubai (AE); Dominik Kimling, Dubai (AE); Harsha Kallayya Mathad, Dubai (AE); Arun Kumar Unnikrishna Karnaver, Dubai (AE)

(73) Assignee: Siemens Logistics GmbH, Nuremberg (DE)

(*) Notice: Subject to any disclaimer, the term of this patent is extended or adjusted under 35 U.S.C. 154(b) by 60 days.

(21) Appl. No.: 17/625,845

(22) PCT Filed: May 26, 2020

(86) PCT No.: PCT/EP2020/064534
§ 371 (c)(1),
(2) Date: Jan. 10, 2022

(87) PCT Pub. No.: WO2021/004686
PCT Pub. Date: Jan. 14, 2021

(65) Prior Publication Data
US 2022/0258986 A1 Aug. 18, 2022

(30) Foreign Application Priority Data
Jul. 8, 2019 (EP) .................................... 19184903

(51) Int. Cl.
*B65G 43/02* (2006.01)

(52) U.S. Cl.
CPC ...... *B65G 43/02* (2013.01); *B65G 2203/0275* (2013.01); *B65G 2203/042* (2013.01); *B65G 2207/48* (2013.01)

(58) Field of Classification Search
None
See application file for complete search history.

(56) References Cited

U.S. PATENT DOCUMENTS 4,613,805 A * 9/1986 Matsuo .................. B65G 54/02
307/64
5,267,638 A * 12/1993 Doane .................... B65G 47/70
198/444

(Continued)

FOREIGN PATENT DOCUMENTS

CN 105491349 A 4/2016
DE 102011053145 A1 3/2012

(Continued)

*Primary Examiner* — Kavel Singh
(74) *Attorney, Agent, or Firm* — Laurence A. Greenberg; Werner H. Stemer; Ralph E. Locher

(57) ABSTRACT

A system and a method for condition monitoring during the operation of a conveyor system, in particular an airport baggage conveyor system, includes conveyor units and a background system. A conveyor unit includes an individual conveyor line and/or a group of conveyor lines. It is possible to record an individual current characteristic of an individual conveyor unit. Each individual conveyor unit has a defined current characteristic during fault-free operation and the background system is configured to record the defined current characteristic and the actual current characteristic of the conveyor unit. The background system is configured to analyze the actual current characteristic of the conveyor unit and to signal, on the basis of the analysis, an impending wear and/or a malfunction of the conveyor system, in particular of a conveyor line of the conveyor unit.

15 Claims, 4 Drawing Sheets

(56) References Cited

U.S. PATENT DOCUMENTS

| | | | |
|---|---|---|---|
| 8,887,897 B2 * | 11/2014 | Itoh | B65G 43/00 |
| | | | 198/781.05 |
| 9,440,797 B1 | 9/2016 | Rimmington | |
| 10,035,660 B2 * | 7/2018 | Zoeller | B61L 1/20 |
| 11,104,520 B2 * | 8/2021 | Hartmann | B65G 43/00 |
| 2012/0048682 A1 | 3/2012 | Itoh et al. | |

FOREIGN PATENT DOCUMENTS

| | | |
|---|---|---|
| JP | S6145819 A | 3/1986 |
| JP | 2010006526 A | 1/2010 |

* cited by examiner

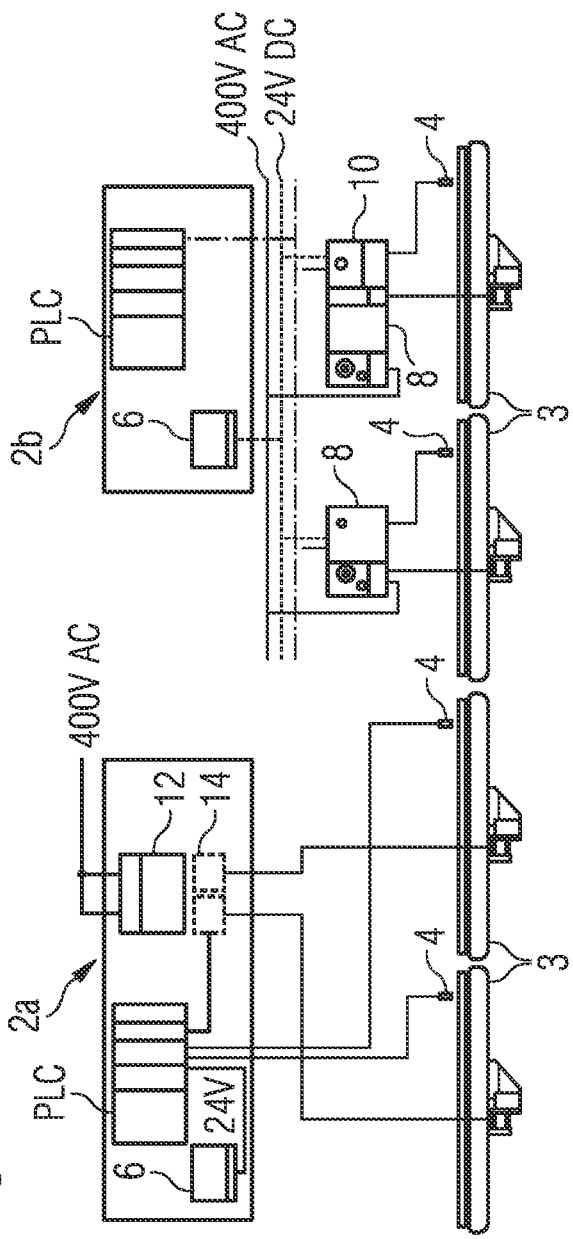
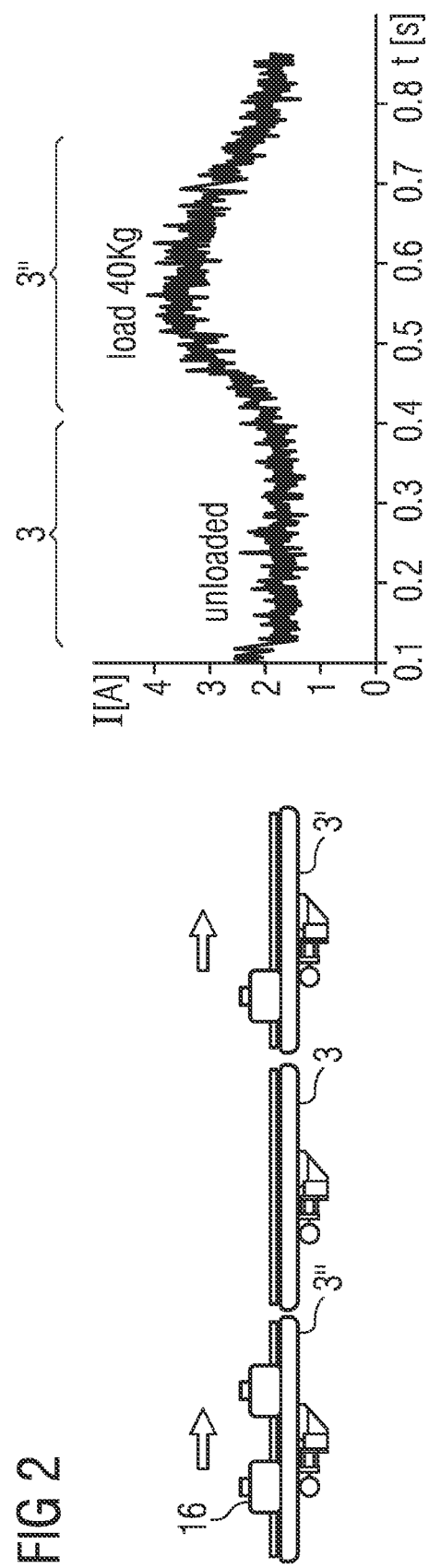
FIG 1
FIG 2

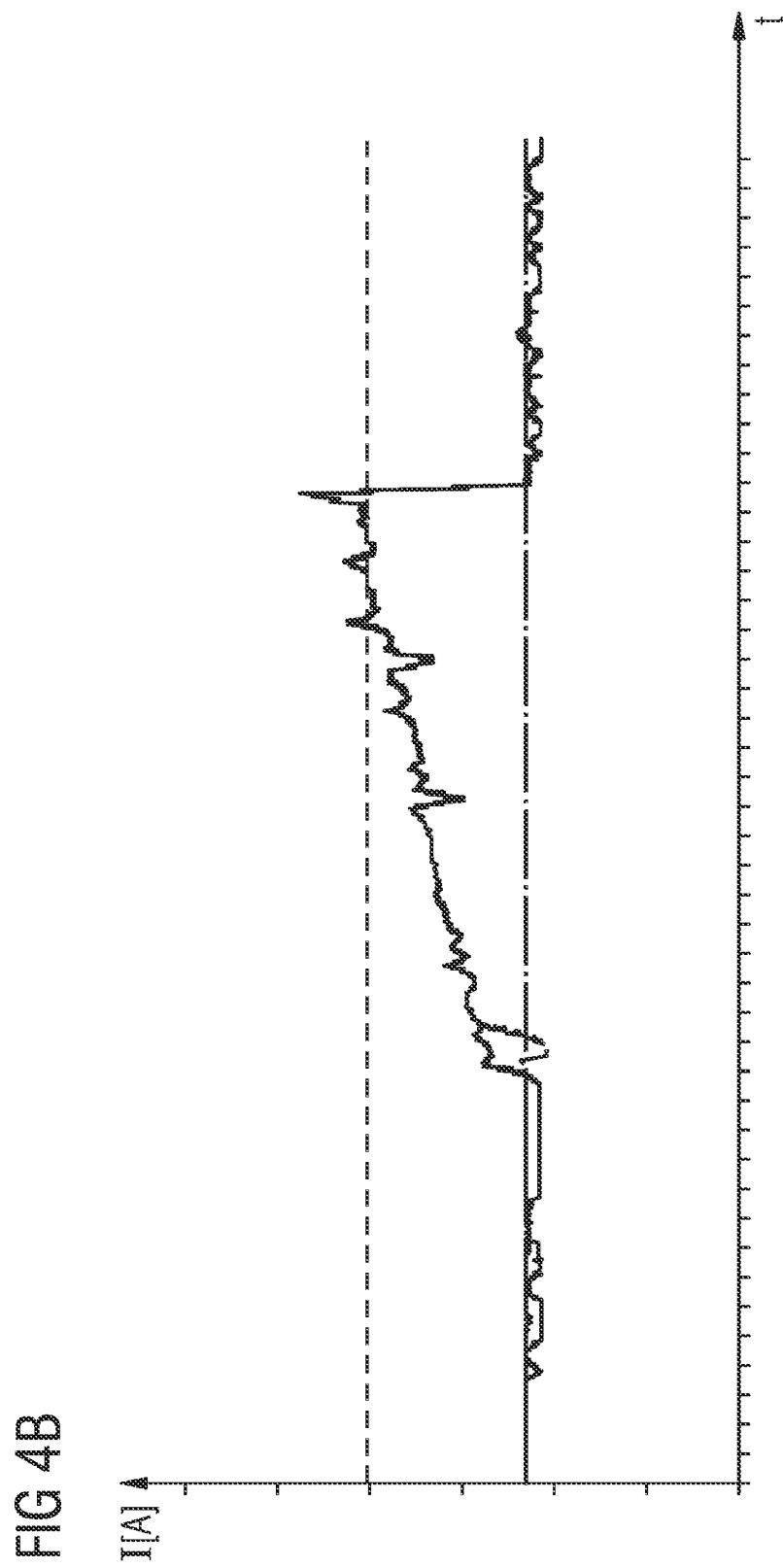

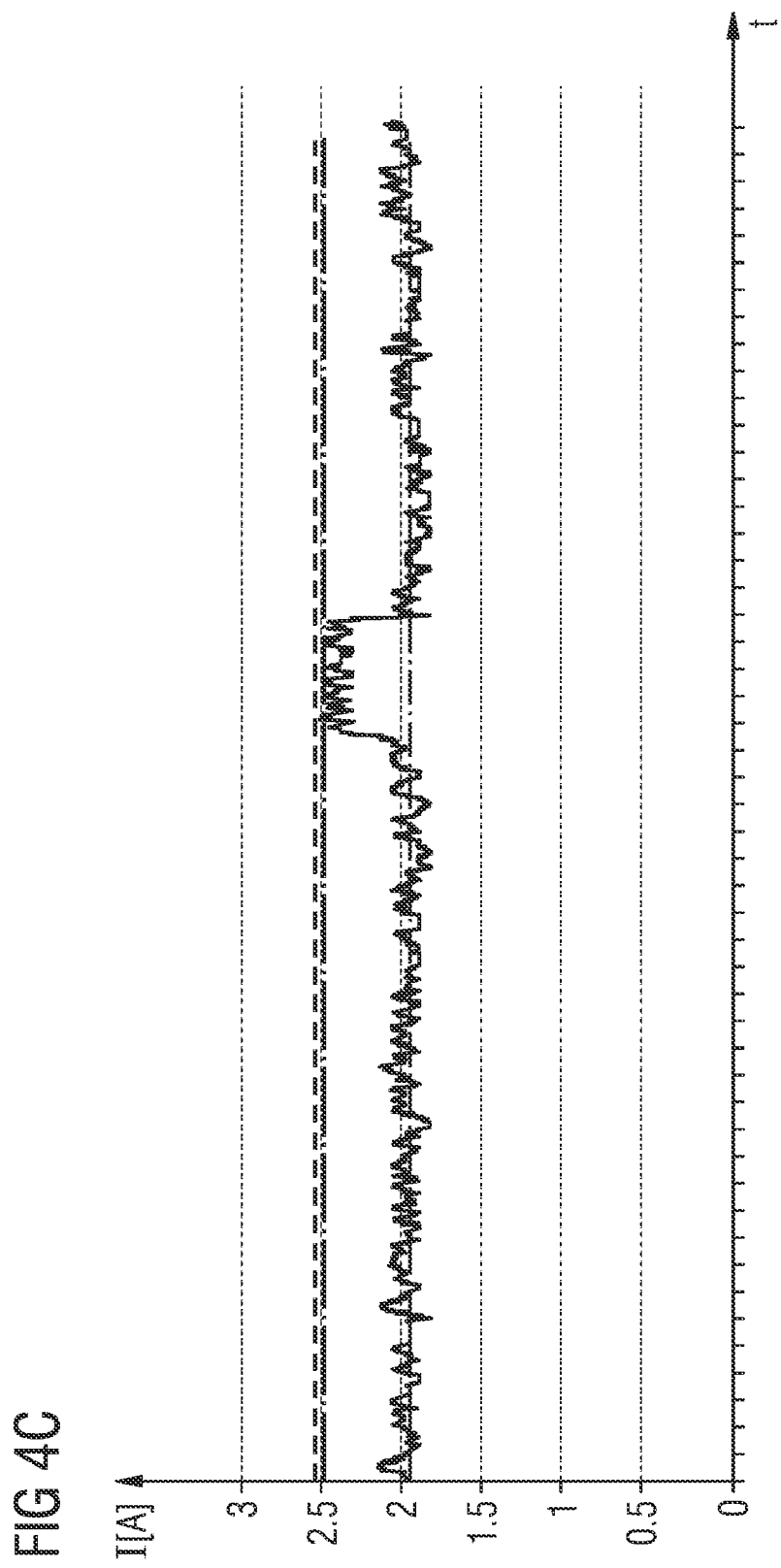

SYSTEM AND METHOD FOR CONDITION MONITORING DURING THE OPERATION OF A CONVEYOR SYSTEM

FIELD AND BACKGROUND OF THE INVENTION

The present invention relates to a system and method for condition monitoring during the operation of a conveyor system in accordance with the independent claims.

Preventive maintenance of conveyor systems has been adopted by some airports as a measure in order to reduce system failures. Although this preventative maintenance according to a regular scheme reduces failure frequency, it does require more replacement parts and working hours than a run-to-failure maintenance that is only performed after a failure has occurred. In addition, it is not possible using preventative maintenance to completely avoid unexpected system failures, but rather they just occur less frequently. A better way to avoid failures is a maintenance strategy that monitors the actual system condition so that it is possible to estimate a residual useful life. On the basis of the residual useful life, the operator of the conveyor system is able to plan the maintenance occurrence.

Conveyor systems are monitored and maintained in a preventative manner with the aim of finding and identifying potential problems that lead to long system downtimes. Condition monitoring systems based on vibration and temperature monitoring of individual components do exist. Such solutions cannot however be retrofitted in a trivial manner to existing conveyor systems. And also if in the case of solutions of this type it is possible to detect sudden changes that indicate system failures, it is still always necessary to perform a manual inspection that is greatly dependent upon the experience, skills and judgment of a service technician. Therefore, a run-to-failure approach is mainly followed and condition monitoring is only used occasionally.

The most commonly used systems in the airport sector are systems on a PLC basis that communicate with an IT host system and SCADA for visualization. Sensor signals are recorded via input modules in fieldbus technology. Conveyor motors are controlled by motor starters or frequency converters.

Conveyor motors for conveying baggage at the airport are controlled using a decentralized motor controller. However, there are still always baggage conveyor systems that operate using centralized motor control technology but these are being modernized step-by-step by decentralized technology.

Motor protection switches on the basis of bimetal trip mechanisms in combination with protectors have been used for monitoring purposes for many decades. In the case of a throughput of several thousands of items of baggage, the conveyors constantly stop and start. A more advanced technology that can overcome extended start and stop procedures was required. The industry responded with the invention of decentralized motor starters, frequency convertors and servo controllers that were installed in the proximity of the conveyor motor in the field, in that they used electronics in order to switch and to protect the drives against overcurrent. Such electronic motor controllers provide the possibility to provide data such as the prevailing driving current, number of starts and stops, running time and prevailing condition progression with a time stamp and to make such data available to the baggage conveying system BHS. The most important baggage conveyor systems were expanded simultaneously with the development of decentralized drive management technology. Airports are not willing to employ more maintenance personal after each system expansion. The continuous competition in the services market makes it necessary to have modern maintenance methods that prevent system failures as far as possible with a small maintenance outlay.

SUMMARY OF THE INVENTION

The object of the present invention is therefore to provide more advanced condition monitoring technology. This object is achieved by the solutions described in the independent claims. In existing systems available data is used that is provided by decentralized motor management hardware as a basis for modern condition monitoring for baggage conveyor systems on a large scale.

The apparatus in accordance with the invention relates to a system for condition monitoring during the operation of a conveyor system, in particular of an airport baggage conveyor system that comprises conveyor units, in addition comprising a background system.

a) A conveyor unit has an individual conveyor line and/or a group of conveyor lines.

b) It is possible to record an individual current characteristic of an individual conveyor unit.

c) In the case of a fault-free operation, each individual conveyor unit has a defined current characteristic and the background system is configured so as to record this and the actual current characteristic of this conveyor unit.

d) The background system is configured so as to submit the actual current characteristic of this conveyor unit for analysis and on the basis of this analysis to signal an impending wear and a malfunction of the conveyor system, in particular of a conveyor line of this conveyor unit.

The term "a current characteristic" is understood to mean all detectable current and voltage values of an individual conveyor unit and of the entire system, wherein a current characteristic comprises an individual or multiple measuring values of an identical or different type. Current values are preferred and can be easily measured. It is possible on the basis of the current characteristic to determine wear of this conveyor unit. The current strength is typical and can be easily measured but it is also possible to measure voltage, current density, electrical work etc. The current characteristic can be an instantaneously recorded value or it can be measured over a specific time period (selectively or continuously). A nominal current is consumed in the case of a normal loading of the conveyor line. In the case of a zero load of the conveyor line, a no-load current is consumed.

The solution in accordance with the invention can be further improved by different embodiments that are each individually advantageous and, unless otherwise stated, can be randomly combined with one another. These embodiments and their associated advantages are described below.

In accordance with one embodiment, the conveyor unit can have one or multiple decentralized motor starters and a conveyor line can comprise at least one conveyor belt. The conveyor system can be driven using decentralized motor starter technology.

In order for a simple measuring variable to be used for the analysis, the current characteristic of a conveyor unit can comprise an amount of current that is consumed by the conveyor unit.

In accordance with one embodiment, the system can comprise a detection means that is configured so as to detect the current characteristic of the conveyor unit in the case of a zero load and/or in the case of a normal loading selectively and/or over a temporal progression and to transmit said current characteristic to the background system. Thus, the detection means can be configured so as to detect an amount of current that is consumed by the conveyor unit or is flowing through said conveyor unit. The zero load can be advantageously measured directly subsequent to a loading that has occurred or a conveying that has been completed shortly prior to the conveyor unit being switched off or shortly prior to the conveyor unit receiving an item of cargo.

In accordance with one embodiment, the background system can be configured so as to record, compare and analyze the actual current characteristic of the conveyor unit over a temporal progression and/or across a plurality of conveyor units. It is thus possible based on the inherent, original current characteristic of the convey unit or in comparison with other, preferably identical conveyor units to determine an anomaly that is developing in the conveyor unit, and thus to perform a calibration in a self-consistent manner.

In accordance with one embodiment, the analysis can comprise an increase and/or variability of the required amount of current (currents that increase, reduce or fluctuate over a period of time).

In accordance with a further embodiment, the background system can be configured so as on the basis of the analysis to draw conclusions regarding a type of malfunction and/or a period of time remaining until an anticipated failure of the conveyor unit. It is thus possible to improve the planning of any necessary maintenance.

In accordance with a further embodiment, the background system can be configured so as on the basis of the analyses that are performed on all the conveyor units to generate a condition image of all the conveyor units in an illustration and/or to generate a ranked order of urgency for maintaining all the recorded conveyor units. It is thus possible to further improve the planning of the maintenance.

With respect to a method, the above mentioned object is achieved by a method for condition monitoring during the operation of a conveyor system, in particular of an airport baggage conveying system, that comprises conveyor units. A conveyor unit has an individual conveyor line and/or a group of conveyor lines. And in a fault-free operation each individual conveyor unit has an individual current characteristic. The method comprises the method steps:

a) Driving the conveyor system and recording the individual current characteristic of an individual conveyor unit.

b) Detecting the actual current characteristic of this conveyor unit.

c) Analyzing the actual current characteristic of this conveyor unit and on the basis of this analysis signal an impending wear and/or a malfunction of the conveyor system, in particular of a conveyor line of this conveyor unit.

In accordance with one embodiment, the current characteristic of a conveyor unit can comprise an amount of current that is consumed by the conveyor unit.

In order to detect a malfunction in a self-consistent manner so that a previous calibration is not absolutely necessary, it is possible in accordance with one embodiment to detect the actual current characteristic of the conveyor unit in the case of a zero load and/or in the case of a normal loading selectively and/or over a temporal progression and to transmit this actual current characteristic to the background system. In addition in accordance with one embodiment, it is possible to record, compare and analyze the actual current characteristic of the conveyor unit over a temporal progression and/or across a plurality of conveyor units.

In accordance with a further embodiment, the analysis of the actual current characteristic can comprise an analysis of an increase and/or variability.

Some embodiments improve the ability to plan the maintenance. In accordance with one embodiment, it is possible based on the analysis that is performed on the actual current characteristic to include conclusions with regard to the type of malfunction and/or a period of time remaining until an anticipated failure of the conveyor unit. In accordance with a further embodiment, it is possible on the basis of the analyses that are performed on all the conveyor units to generate a condition image of all the conveyor units in one illustration and/or to generate ranked in order of urgency for maintaining all the recorded conveyor units.

The proposed condition-monitoring solution requires preferably a decentralized motor starter technology and consequently a decentralized drive of the conveyor system or at least a possibility of recording the current characteristic of individual conveyor units. A detection means, for example a current and/or voltage measuring device, can in principle also be added retrospectively. If a conveyor line comprises at least one conveyor belt, the conveyor unit can be realized in a particularly simple manner. In addition, it is possible to identify maintenance events in a simple manner since a fault during the operation of a conveyor belt is swiftly reflected in the amount of current consumed.

Embodiments of the invention are further explained below with the aid of the figures.

BRIEF DESCRIPTION OF THE FIGURES

FIG. 1 shows typical drive controls in the baggage conveyor system;

FIG. 2 shows a current curve of a conveyor belt in dependence upon its loading;

DETAILED DESCRIPTION OF THE INVENTION

Figure 3:
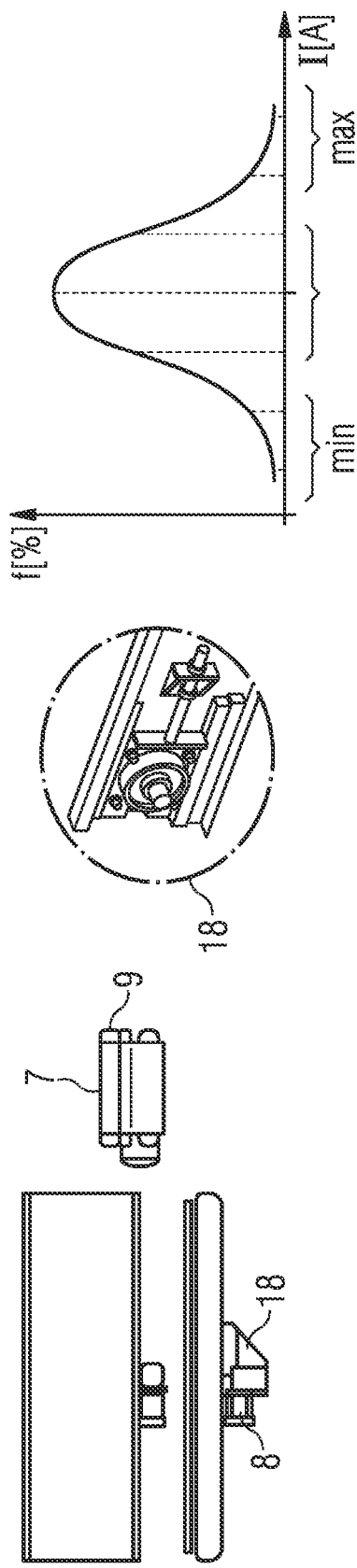
FIG. 3 shows a conveyor belt together with its main components.

Theoretically, conveyors 3 that have an identical length, identical motor type, identical conveying speed, identical angle and identical belt voltage without a load should consume the identical amount of current. Small deviations in the motor efficiency and the power factor in different operating points are a cause for the current and torque not being precisely directly proportional to one another. The relationship between the induction motor current and the axle torque around the full load current is however almost directly proportional to the current and conversely. For a motor that is driving a conveyor belt in the load free state, it is only necessary for the torque to be sufficient to overcome the friction between the belt and the bearing. This zero load current can be used in order to monitor the prevailing condition for baggage conveyor systems.

The torque T that is required by the motor so as to drive the conveyor belt is dependent upon the diameter D of the deflection roller, external force F, the mass M of the load that is to be transported by the conveyor belt (typically one or multiple items of baggage), the gravitation g, the coefficient of friction $\mu$ of the conveyor belt, the angle of increase $\phi$ and a mechanical factor $\beta$, which is in the case of an ideal setting of the conveyor unit 3.

If the current characteristic is measured on each conveyor 3, if this is operated in the idle state, it is possible to conclude therefrom the condition of the conveyor 3. A current characteristic that is measured in the idle state does not have any fluctuations caused by a loading and is therefore the most reliable. Idle state conditions occur by chance in phases in which the volume of baggage is small.

FIG. 1 illustrates schematically conveyor systems 2 using centralized (FIG. 1a) and decentralized (FIG. 1b) motor starter technology as they are typically configured in airport baggage conveyor systems. In the illustrated embodiments, each conveyor unit 3 has only one conveyor line/conveyor 3. It is also possible that one conveyor unit 3 comprises multiple conveyor lines/conveyors 3. Each conveyor unit 3 is equipped with a motor and a motor starter 8 and a sensor 4 and is connected to a current source 6. The system has if need be a frequency converter 10, a protective switch 12 and a protector 14. A PLC logic controller (programmable logic controller) is equipped so as to recognize whether such an idle state condition is present, possibly supported on the basis of the input of a signal of the sensor 4. In order to measure the idle state condition, the PLC requires a software modification so that the current is measured on each conveyor 3 without a load (zero load state—condition for particularly easily comparable measuring values). A zero load state is present for example directly after an item of baggage has left the conveyor 3. This can be determined using the sensor 4 or recognized on the basis of the conveyor length traveled. The current characteristic of the zero load state can be detected directly subsequent to a loading that has occurred or a completed conveying, directly after the item of baggage 16 has left the conveyor 3 immediately before the motor 8 of this conveyor 3 is switched off.

FIG. 2 illustrates the current curve I(A) as a current characteristic of a laden conveyor unit 3" and a conveyor unit 3 under a zero load in accordance with a further embodiment of the invention.

A higher mechanical resistance (mechanical factor β) leads to a higher torque of the motor. The conveyor systems at large airports operate with several thousands of conveyor belts 7, wherein one conveyor unit 3 comprises one or more conveyor belts. If in this case a group of similar conveyor units 3 (identical length, speed, angle, identical curve radius, identical motor type, . . . ) is combined to form a group of conveyor units 3, the current characteristic of these similar conveyor units 3 can be compared.

The solution provided is based on conveyors that are grouped together. A group comprises conveyors 3 of identical length, speed, angle, identical radius for curves and identical motor type. The target is to have as many as possible conveyors 3 of the same type, so that the measured current values of the current characteristic can be compared.

A monitoring of the current characteristic can be used for monitoring the operation since typical faults and interruptions change the current characteristic even before a total failure occurs. A water leak in the building (water drips onto the conveyor belts which then become wet through, leads for example to the fact that the motor requires more torque. In addition since the torque and current are proportional, the fuse eventually burns through or a protective switch switches off the motor 8. During the course of time, deposits collect on a belt conveyor 3 between the conveyor belt and sheet metal carrier. Once the amount of the deposits under the conveyor belt exceeds a specific amount, the required torque of the motor 8 changes. In the case of an ever increasing current consumption, the protective switch ultimately trips. However, the deposits can also lead to the fact that the conveyor belt 7 no longer has the correct hold and it slips. Less current is then consumed since the conveyor belt is no longer being driven correctly.

There are many similar examples where a problem has occurred in the system and the operating personal have been made aware that the circuit breakers have tripped. The fault development mainly begins with sporadic tripping events (protective switch being switched off). Generally, the trip interval is shorter and in the worst case the conveyor belts become jammed and a remote control is no longer possible.

Rather than wait for tripping events, available monitor current data that is provided by the motor management hardware can be used in order to recognize deviations as an early indicator for the imminent development of an anomaly.

Motor starters 8 have multiple protection classes and the desired class can be selected depending upon the motor type. It requires the multiple current until the circuit breaker trips. For a motor starter 8 having class 10, a current that amounts to six times the nominal current would last 10 seconds before the circuit breaker trips. In view of the fact that a fault normally begins with sporadic tripping events and the trip interval becomes shorter over time, it is expedient to recognize imminent malfunctions earlier and not to wait until the circuit breaker trips. At the beginning of a malfunction, the motor current is only slightly above the nominal current. An ever shorter trip time can indicate a higher current. If also in the case of the maximum loading of the conveyor 3 during a fault-free operation the nominal current is not achieved, an impending failure can be predicted by the nominal current being exceeded. Even small deviations of the actual current characteristic from the defined current characteristic that by no means lead to failures are an indication of impending failures.

In practice, this is not the case and the main reason for the deviations are fluctuations of the mechanical settings. Further possible causes for deviations are for example damaged drive components, incorrect settings of the brakes, deteriorated oil quality, transmission damage.

In order to render it possible to compare the current characteristic of multiple conveyors 3, conveyors 3 in accordance with the invention as illustrated in FIG. 3 are equipped with a belt tensioning mechanism 18 so that the conveyor belt 7 is always tensioned around the deflecting roller 9 with the correct tension. In addition, this reduces the probability of failures caused by the conveyor belt 7 slipping when the belt tension is too low (mainly associated with excessively low current values—min) and by sluggish conveyor belts that become easily jammed when the belt tension is too high (mainly associated with excessively high current values—max). Very low and very high current values are associated with a high probability of mechanical problems.

Further components that are to be controlled for a high comparability are the conveyor frame, conveyor belt 7, belt pulley and bearing, motor type and belt tensioning mechanism. In the case of conveyor belts 7, at least two belt pulleys guide an endless belt that is driven by an electric motor. The belt 7 is driven forwards by the drive pulley. The motor must supply sufficient torque in order to overcome the friction of the belt and to transport the load as required.

Conveyors 3 having perfectly tensioned belts 7 (β=1) consume the average current in the idle state. An over-tensioning (β>1) leads to a higher measured current and an under-tensioning (β<1) leads to a lower measured current. In order to make a group of conveyors 3 more comparable, conveyors 3 (β≠1) that deviate from the mean value are examined, the belt tension verified and where applicable adjusted. If the belt tension is not the cause of the anomaly, further checks are required followed by a fault message.

A motor that must supply a higher torque consumes a higher current that can be measured and used for calculating the mechanical resistance β. If the majority of all the conveyors 3 from one group is adjusted correctly, β=1 should be measured. It is possible to illustrate in one diagram all up-to-date data of a group of conveyors 3 that have been processed with regard to a standard deviation. Taking into consideration the relationship between the torque and the current, up-to-date data is available which can be used to indicate mechanical deviations. Therefore, a conveyor 3 having an "anticipated" mechanical resistance (β=1) would consume an average current value. Conveyors 3 having mechanical resistance and simultaneous consumption of a higher or lower current than the "anticipated" mean current have a high probability of mechanical problems (β≠1). Since conveyor systems are constructed with standard conveyors 3, these can be organized into groups of conveyors 3 of the same length having the same motor. Conveyors 3 having the identical length, the identical angle, identical mechanical adjustments, identical environmental and loading conditions and the identical speed, that are equipped with the identical motor, should consume the identical amount of current during a fault-free operation and consequently have the same current characteristic.

Deviations from the current characteristic are regarded as indicators for a prevailing mechanical problem or incorrect adjustments. If it is necessary for the motor to supply more torque (for example as a result of excessively tensioning the belt), this leads to a higher current consumption.

For a baggage conveying system of a large hub airport that has been in operation for decades, it is assumed that the list of conveyors 3 having different belt tensions or anomalies is long. It takes months before the entire system is checked and is fault-free. The result after correction measures is that all conveyors 3 of the same group consume the identical amount of current. The last phase is a continuous monitoring of the prevailing current characteristic.

The state of the current characteristic of all the conveyors 3 of the entire conveyor system is to be visible at a glance in the form of an instrument panel. The variability of the current characteristic of individual conveyor units 3 can be plotted for this purpose against their standardized increase. Outliers lie outside a collection of conveyor units 3 that are functioning in a fault-free manner. Mechanical failures frequently lead to an increase in current. In the case of a failure, circuit breakers 12 or overcurrent protector devices 14 are tripped. In the case of a high rate of increase, a fault occurs swiftly, in the case of a low rate of increase, a fault occurs more slowly with the result that it is possible to conclude on the basis of the deviation that maintenance is urgently required.

In accordance with one embodiment, a KPI value of the entire system can be represented based on a quotient of variability values that contain errors and the variability values of all the conveyor units 3.

Figure 4A:
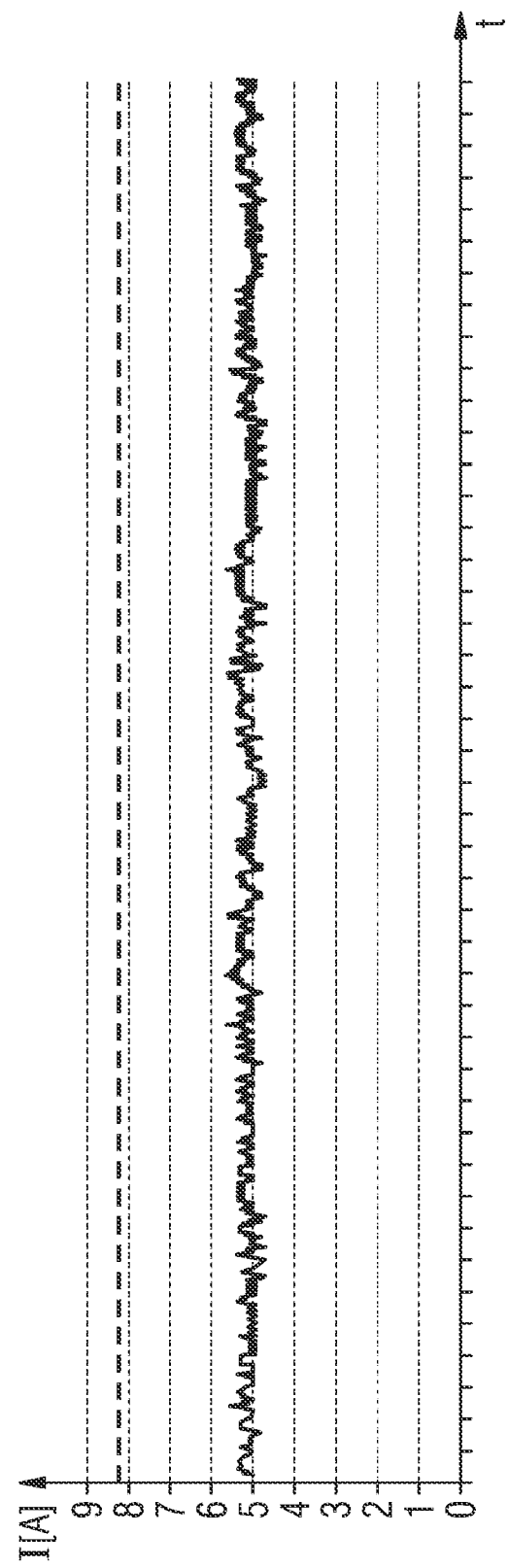
FIG. 4 shows current curves of conveyor belts with and without anomalies.

FIG. 4 illustrates current curves of a conveyor unit 3 in the case of a fault-free operation without anomalies (FIG. 4a), a conveyor unit 3 having a malfunction that occurs slowly (for example a transmission failure with initially sporadic slipping, which over time would lead to the complete jamming of the motor) and its elimination (FIG. 4b), and also the current curve of a conveyor unit 3 having a malfunction that occurs suddenly (a lump that is jammed between the side protector and conveyor belt) (FIG. 4c). Once the fault has been eliminated, the current characteristic immediately re-adopts the values of the fault-free operation.

The invention in accordance with one embodiment will provide a monitoring system that indicates mechanical problems in the conveyor systems, in that conveyors 3 are grouped together according to the same type and motor. Measuring the current characteristic in defined time intervals and under zero load, possibly with additional data and correlations with regard to start/stop and operating hours. Each conveyor belt 7 has tensioning stations for adjusting the conveyor belt 7. An incorrect adjustment leads to over-tensioning or under-tensioning, one of the main causes of wear.

The invention relates to a system that uses prevailing measurements of a group of conveyor units 3, calculates the mathematical average and extracts outliers. It is assumed that the outliers indicate in both directions incorrectly set conveyor units 3 that quite probably have a reduced serviceable life.

Using the invention, such adjustment errors can be indicated immediately as they occur, and also on the basis of the change of the current characteristic other potential problems are visible for the maintenance personal for maintenance. A further advantage is that it is possible in real time to determine the state of an entire conveyor system, visible and impending failures and failures that have already occurred (the latter being something to be avoided). On the other hand, the current value tendency is monitored. Deviations that occur from the average serve as an early indication of a fault that is developing.

The system used in accordance with one embodiment uses up-to-date data regarding a group of conveyor units 3 of the same conveyor type in order to identify outliers as an indicator for an impending failure and/or a failure that has already occurred and/or incorrect mechanical adjustments.

This offers in a very reliable manner a system that supplies a background system, for example, a database, continuously with up-to-date data in order to recognize in good time wear or imminent problems that could possibly lead to downtimes.

In accordance with one embodiment, the system or method comprises or uses for condition monitoring a data processor server and a 4G modem together with the available local network (LAN). Data can be retrieved by a programmable logic controller (PLC) that operates the system. Statistical data such as operating hours and the equivalent value of starts and stops are up-to-date and available at any time. The most valuable feature is provided by the up-to-date current flow illustrations, in other words the current characteristic of the motor starter 8. By evaluating the current of the parameterizable electronic overload protector, it is possible to provide a function with which the availability of the drives can be increased, as well as reliable messages regarding exceeding or being below target values. The up-to-date drive data vary independence upon the load that is actually being transported on the conveyor belts 7, with the result that the development of a window recognition without a load is necessary (see above).

The term "zero load" means that the conveyor 3 is running without a loading. During the operation, such windows occur in time periods where the volume of baggage is low. For energy-saving reasons, conveyor belts 7 are switched off during periods of low volume. The conveyor belt is always switched off when one item of baggage 16 comes to the end of the conveyor belt without additional items of baggage 16 following the conveyor belt. Shortly prior to the idle state switch-off being triggered, the conveyor 3 runs empty. The up-to-date value in the idle state can be reproducible as a zero load current shortly before the switch-off and can be used to predict anomalies.

The motor starter 8 or frequency converter 10 of each drive constantly supply up-to-date data. Irrespective of the actual load state, these values change constantly. In the moment in which a conveyor 3 has been switched into the idle state, the PLC program updates the idle state value of the conveyor 3. Using such a routine, it is possible to ensure that the prevailing values are always up-to-date and are measured without a load.

Some frequent faults of a conveyor system that change the current characteristic are described below.

One frequent fault is incorrect tracking of the belt 7. A belt 7 is configured and tensioned in such a manner that the belt 7 maintains a specific path. If the tracking is incorrect, the belt 7 moves to one side and deviates from the intended path. Belts 7 that are not running correctly normally cause more friction. This can lead to serious damage—in almost all cases the belt has to be replaced which leads to system downtimes. Frequently, the relevant circuit breaker trips.

Belt slippage as a result of the belt being incorrectly tensioned can have a direct influence on the working capacity. During the course of time and as a result of frequent wear of mechanical parts, the available friction is no longer sufficient to grip the belt, which can lead to excessive elongation, audible creaking and transportation slippage. A deviation in the belt tension influences the torque that is to be supplied by the motor, which leads to current being consumed.

Conveyor belt systems are produced from metal components and wear away during the course of time and usage. If metal rollers become jammed, the belt can become displaced.

Deposits are a further main cause of damage to conveyor belts 7. Locks, zips and handles that fall off the items of baggage 13 that are being transported can land between the belt pulleys or below the belt 7 and cause damage.

Motors or transmissions wear and fail over the course of time. In many cases, such faults are caused by lubrication problems. Such a failure leads typically to a great mechanical resistance and is flagged by a tripped circuit breaker.

Almost all types of electrical problems or connection problems, possibly caused by aging or corrosion, lead to a greater resistance and consequently to a higher current. Unqualified maintenance personal can adjust the system incorrectly, for example over-tension or under-tension the belt.

A systematic analysis of possible causes of faults that lead to downtimes indicates that in the main first a deviation of the current characteristic occurs and only then does the system fail. It is therefore possible to use current monitoring for a modern condition monitoring system using the available motor starter current data for baggage conveying systems.

In accordance with one embodiment, the background system records the data twice daily. Once the data has been recorded, the PLC deletes its prevailing data blocks. Conveyor 3 for conveyor 3, the data block is then always refilled with up-to-date actual values if a specific conveyor 3 is switched into the idle state (zero load). In the improbable case that the conveyor 3 runs continuously and an idle state event does not occur, the value would remain at zero. Moreover, data relating to conveyor belts that are not ready for operation would remain at zero.

The PLC software is modified to the extent that it is possible to access data from the motor starters 8 and frequency converters 10. The background system comprises a data pre-processing server and a database which is developed and configured and as a server is connected to the local network (LAN) of the airport. PLC software measures the current in the idle state. A maintenance dashboard has been developed that displays changes in the anticipated current. The local solution is transmitted into the cloud-based platform. A system-wide solution accesses the data from all the conveyor units 3 that is transmitted to the cloud-based platform. The maintenance dashboard is connected to the cloud platform.

The motor starter data of individual conveyor units 3, such as the current characteristics, if need be together with the operating hours and/or start-stop counter values, is linked to the event time, the building code and area code, the database node ID, the conveyor name and the motor type and the conveyor speed. In addition, it is possible to list the motor nominal current and the theoretical conveyor current in the idle state. The values of the current characteristic should lie below the motor nominal current. In the case of a fault-free conveyor unit, the actual data only slightly deviates over time from the calculated theoretical value and in addition from the mean value of all similar conveyor units 3.

In accordance with a further embodiment, the background system is configured so as to record, compare and analyze the actual current characteristic of the conveyor unit 3 over a temporal progression and/or across a plurality of conveyor units 3 that are preferably but not necessarily configured in an identical manner.

The invention claimed is:

1. A system for condition monitoring during the operation of a conveyor system or an airport baggage conveyor system, the system comprising:
   a) a group of individual conveyor units of an identical conveyor type, each individual conveyor unit of said group including at least one of an individual conveyor line or a group of conveyor lines, each conveyor line including at least one conveyor belt;
   b) each individual conveyor unit having an individual current characteristic to be recorded;
   c) a background system configured to record a defined current characteristic of each individual conveyor unit during a fault-free operation and an actual current characteristic of said conveyor unit;
   d) said background system configured to submit the actual current characteristic of said each individual conveyor unit for analysis and to signal an impending wear and a malfunction of the conveyor system or of a conveyor line of the conveyor unit based on the analysis; and
   e) said background system configured to compare actual current characteristics of each individual conveyor unit of said group to current characteristics for said group to identify outlier individual conveyor units as an indicator for at least one of an impending failure or a failure having already occurred or incorrect mechanical adjustments.

2. The system according to claim 1, which further comprises at least one of one or more decentralized motor starters of said conveyor unit or at least one conveyor belt of said conveyor line.

3. The system according to claim 1, wherein the current characteristic of said conveyor unit includes an amount of current being consumed by said conveyor unit.

4. The system according to claim 1, wherein the current characteristic of said conveyor unit is detected during at least one of a zero load or a normal loading at least one of selectively or over a temporal progression, and the current characteristic is transmitted to said background system.

5. The system according to claim 1, wherein said background system is configured to record, compare and analyze the actual current characteristic of said conveyor unit at least one of over a temporal progression or across a plurality of said conveyor units, and the analysis includes at least one of an increase or a variability of an amount of current required.

6. The system according to claim 1, wherein said background system is configured to draw conclusions based on the analysis regarding at least one of a type of malfunction or a period of time remaining until an anticipated failure of said conveyor unit.

7. The system according to claim 1, wherein said background system is configured, based on analyses performed on all of said conveyor units, to at least one of generate a condition image of all of said conveyor units in one illustration or generate a ranked order of urgency for maintaining all of said recorded conveyor units.

8. The system according to claim 1, wherein said current characteristics of said group used in the comparison is a mathematical average of the actual current characteristics for all individual conveyor units of said group.

9. A method for condition monitoring during the operation of a conveyor system or an airport baggage conveyor system including a group of individual conveyor units of an identical conveyor type, each individual conveyor unit of the group having at least one of an individual conveyor line or a group of conveyor lines, each conveyor line including at least one conveyor belt, and each individual conveyor unit of the group having an individual current characteristic in a fault-free operation, the method comprising:
 a) driving the conveyor system and recording the individual current characteristic of an individual conveyor unit;
 b) detecting an actual current characteristic of the individual conveyor unit;
 c) analyzing the actual current characteristic of the individual conveyor unit and based on the analysis signaling an impending wear and a malfunction of the conveyor system or of a conveyor line of the individual conveyor unit; and
 d) the analyzing step including comparing an actual current characteristic of the individual conveyor unit to current characteristics for the group to identify if the individual conveyor unit is an outlier from the group as an indicator for at least one of an impending failure or a failure having already occurred or incorrect mechanical adjustments.

10. The method according to claim 9, which further comprises including in the current characteristic of a conveyor unit an amount of current consumed by the conveyor unit.

11. The method according to claim 9, which further comprises detecting the actual current characteristic of the conveyor unit during at least one of a zero load or a normal loading at least one of selectively or over a temporal progression, and transmitting the actual current characteristic to a background system.

12. The method according to claim 9, which further comprises recording, comparing and analyzing the actual current characteristic of the conveyor unit at least one of over a temporal progression or across a plurality of conveyor units, and analyzing at least one of an increase or a variability in the analysis of the actual current characteristic.

13. The method according to claim 9, which further comprises drawing conclusions based on the analysis performed on the actual current characteristic with regard to at least one of a type of malfunction or a time period remaining until an anticipated failure of the conveyor unit.

14. The method according to claim 9, which further comprises based on analyses performed on all of the conveyor units, at least one of generating a state image of all of the conveyor units in one illustration or generating a ranked order of urgency for maintaining all of the recorded conveyor units.

15. The method according to claim 9, wherein the current characteristics of the group used in the comparison step is a mathematical average of the actual current characteristics for all individual conveyor units of said group.

\* \* \* \* \*